United States Patent
Alam et al.

(10) Patent No.: US 6,682,219 B2
(45) Date of Patent: Jan. 27, 2004

(54) ANISOTROPIC SUPPORT DAMPER FOR GAS TURBINE BEARING

(75) Inventors: Mohsiul Alam, Chandler, AZ (US); Doug K. Spencer, Mesa, AZ (US)

(73) Assignee: Honeywell International Inc., Morristown, NJ (US)

(*) Notice: Subject to any disclaimer, the term of this patent is extended or adjusted under 35 U.S.C. 154(b) by 35 days.

(21) Appl. No.: 10/115,823

(22) Filed: Apr. 3, 2002

(65) Prior Publication Data

US 2003/0190099 A1 Oct. 9, 2003

(51) Int. Cl.⁷ .............................. F16C 27/04
(52) U.S. Cl. ........................ 384/99; 384/581
(58) Field of Search ............... 384/99, 581, 582, 384/535, 536

(56) References Cited

U.S. PATENT DOCUMENTS

| | | |
|---|---|---|
| 4,027,931 A | 6/1977 | Streifert |
| 4,084,861 A | 4/1978 | Greenberg et al. |
| 4,214,796 A | 7/1980 | Monzel et al. |
| 4,429,923 A | 2/1984 | White et al. |
| 4,453,783 A | 6/1984 | Davis et al. |
| 4,509,804 A | 4/1985 | Klusman |
| 4,547,083 A | 10/1985 | Hörler |
| 4,668,108 A | 5/1987 | McHugh |
| 4,872,767 A | 10/1989 | Knapp |
| 4,880,320 A | 11/1989 | Haines et al. |
| 4,947,639 A | 8/1990 | Hibner et al. |
| 5,201,585 A | 4/1993 | Gans et al. |
| 5,421,655 A | 6/1995 | Ide et al. |
| 5,603,574 A | 2/1997 | Ide et al. |
| 5,667,308 A | 9/1997 | Nose et al. |
| 6,325,546 B1 | 12/2001 | Storace |

FOREIGN PATENT DOCUMENTS

DE 39 36 069 A1 5/1991

*Primary Examiner*—Lenard A. Footland
(74) *Attorney, Agent, or Firm*—Robert Desmond, Esq.

(57) ABSTRACT

An apparatus and method that provides a flexible anisotropic support, which may accommodate open, closed, or re-circulating squeeze film damper in parallel, has improved internal rolling element clearances, limits maneuver and blade loss responses by limiting rotor excursion, and has a rotor centering feature. This is accomplished through the combination of beam and ring arrangement, which provides support anisotropy that produces beneficial cross-coupling stiffness for the support to control synchronous and non-synchronous vibration.

28 Claims, 2 Drawing Sheets

ANISOTROPIC SUPPORT DAMPER FOR GAS TURBINE BEARING

BACKGROUND OF THE INVENTION

The present invention generally relates to a turbo machinery and, more specifically, to a system and apparatus that interfaces between bearing elements and the static support structure for turbo machinery.

Synchronous vibration caused by mass imbalance is common in rotating machinery and is usually caused by a rotating mass inbalance. Imbalance frequently occurs when the mass center of the rotor is not coincident with its geometric center. Another form of vibration is non-synchronous rotor whirl, which occurs when a radial deflection of the rotor results in tangential force normal to the deflection. The magnitude of the tangential force increases with the deflection. The system will become unstable if there is insufficient damping. Damping the vibration in a turbomachine provides quiet and comfortable efficient operation of the machine, reduced fatigue stress on the machine and its supports, and a safeguard to the damage that can be caused by unstable vibration.

Generally, within rotating machinery, at least two bearings are required to support the rotating shaft, and these bearings must accommodate misalignments between the bearing and the rotor. Misalignments can cause some bearings to bear an excessive load, while other bearing are carrying very little load. Various solutions have been attempted to reduce misalignment, limit maneuver deflection and reduce vibration.

U.S. Pat. No. 4,872,767 discloses a bearing support for a gas turbine engine. The bearing support has one or more circumferential leaf spring elements which provide radially resilient support for the shaft while being axially stiff to reduce axial thrust movement of the shaft. The spring rate of the support is designed to shift engine vibratory resonances so that they occur outside the normal speed range of the engine and the support may include internal damping to minimize resonant vibratory peaks. Various bearing support embodiments are also disclosed. While the '767 patent represents a significant advancement in the art, it is lacking an off-set feature that centers the bearing in the hydraulic mount cavity against the static deflection due to the weight of the rotor or a maneuver and blade loss response limiting feature. It also lacks anisotropic stiffness distribution of the support.

It is also known within the art to include damping in the spring mounting, typically this is accomplished by supplying fluid (usually oil) into a cavity between the bearing support and engine frame. Much of the prior art has been devoted to such damping methods. U.S. Pat. No. 5,201,585, for example, discloses the use of an improved fluid film having a squeeze film damper tailored to the dynamic vibration characteristics. Compact cantilevered spring bars support the squeeze film damper and thin fluid film bearing surface against the rotor shaft. The spring bars fit compactly within the bearing. The squeeze film damper includes oil plenums that provide a reservoir of fluid and prevent air from entering the damper and thin film fluid. Such a system does not accommodate a rolling element bearing, the four-interlocking sections, assembled in two halves, is a complicated design. Precise dimensional control, required by the squeeze film, is very difficult to achieve, and the use of squeeze film between two members of the same cantilever type support structure does not produce effective damping.

U.S. Pat. No. 4,668,108 discloses an anisotropic bearing support for a high-speed rotor, which includes at least two support devices having different values of stiffness. The two support devices act at substantially the same point on the perimeter of the rotor along radial directions, which are angularly spaced apart from each other. The resulting anisotropic bearing support reduces the incidence and severity of rotor vibration and improves rotor stability. The '108 patent achieves anisotropy by pivot supports and blocks. As such, such a system can only accommodate a journal bearing. Further, the '108 patent lacks a support off-set feature to center against static deflection due to the weight of the rotor and a maneuver and blade loss response limiting feature.

As can be seen, there is a need for a flexible anisotropic support, which may accommodate open, closed, or re-circulating squeeze film damper in parallel, has improved internal rolling element clearance, limits maneuver and blade loss by limiting rotor excursion, and has an off-set feature that centers rotor against static deflection due to the weight of the rotor and simple enough to control precise dimension required for the optimum performance of the squeeze film.

SUMMARY OF THE INVENTION

In one aspect of the present invention, an apparatus and method for centering the bearing of turbo machinery, eliminating unstable vibrations and improving synchronous vibrations is disclosed. It is unlike the prior art in that asymmetrically arranged beams achieve flexibility and bearing support anisotropy, the bearing support accommodates open, closed or re-circulating squeeze film damper in parallel. The bearing support may also be the bearing outer race, resulting in improved internal rolling element clearances for better dynamic behavior. The bearing support protects rotor from high maneuver and blade loss response by limiting rotor excursion.

In another aspect of the present invention is an apparatus for supporting and stabilizing a rotating shaft in a machine comprising a rotor group supported by at least two bearing assemblies, a support housing surrounding said bearing assemblies and connected to an engine case, wherein said support housing has a non-concentric ring, which centers the rotor. The support housing accommodates at least one anisotropic support damper comprised of at least two rings connected by asymmetrically arranged beams, wherein the anisotropic damper may be removably attached to said support housing and interface the bearing assemblies and support housing.

Another aspect of the present invention is an apparatus for supporting and stabilizing a rotating shaft in a machine comprising a rotor group supported by at least two bearing assemblies, at least one anisotropic support damper, an engine case, at least two nuts and at least two studs for attaching said anisotropic support damper to said support housing, and support housing surrounding the bearing assemblies and connected to the engine case. The support housing has an inner and outer diameter. The anisotropic support damper may be comprised of an aft ring and variable diameter forward ring, wherein the aft ring and variable diameter forward ring are connected by at least two asymmetrically arranged beams and the variable diameter forward ring forms the outer race for the bearing assembly. There may also be an inner race for the bearing assembly. There may be also a hydraulic mount formed by the gap between the support housing's inner diameter and the anisotropic support damper.

According to another aspect of the present invention, an apparatus for supporting and stabilizing a rotating shaft in a machine is disclosed comprising a rotor group supported by at least two bearing assemblies, wherein the bearing assemblies contain at least one roller bearing with an inner race and an outer race, at least one anisotropic support damper, a support housing, an engine case, a support housing surrounding said bearing assemblies and connected to an engine case, wherein said support housing accommodates squeeze film damper in parallel and has an oil supply line contained therein for the delivery of oil through an annular grove to a hydraulic mount, said hydraulic mount being a closed mount formed by a gap between said support housing's inner diameter and said anisotropic support damper and having piston ring grooves, said anisotropic support damper comprised of an aft ring and variable diameter forward ring, wherein said aft ring and said variable diameter forward ring are connected by at least two asymmetrically arranged beams and said variable diameter forward ring forms the outer race for said roller bearing, at least two nuts and at least two studs for attaching said anisotropic support damper to said support housing.

According to another aspect of the present invention, a method of supporting a rotor structure with a stationary machine frame is disclosed. This method includes the steps of mounting a bearing assembly for supporting a rotor within a movable member, suspending the member from the machine frame upon at least two bearing assemblies, establishing a fluid damping film between the member and the machine frame and centering the movable member against static deflection due to the rotor weight, providing cross-coupling stiffness against instability force, optimizing modal damping through the softness of the beams, limiting rotor excursion during high maneuver and blade loss by providing a bumper with a precise gap that will not compromise squeeze film performance.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention provides a centering feature to the bearing of turbo machinery, eliminating unstable vibrations and improving synchronous vibrations. It is unlike the prior art in that asymmetrically arranged beams achieve flexibility and bearing support anisotropy, the bearing support accommodates open, closed or re-circulating squeeze film damper in parallel. The bearing support may also be the bearing outer race, resulting in improved internal rolling element clearance for better dynamic behavior, and the bearing support limits maneuver and blade loss by limiting rotor exclusion.

One aspect of the invention is an apparatus for supporting and stabilizing a rotating shaft in a machine comprising a rotor group supported by at least two bearing assemblies, a support housing surrounding the bearing assemblies and connected to an engine case. The bearing assembly may be stacked with a stub shaft and clamped by a nut. It should be understood that the bearing assembly may contain any bearing known within the art. According to one embodiment, the bearing may be a roller bearing. The support housing may have a non-concentric bore, which centers the rotor when support is statically deflected by the weight of the rotor. The support housing accommodates at least one anisotropic support damper comprised of at least two rings connected by asymmetrically arranged beams, wherein the anisotropic damper may be removably attached to said support housing and interface the bearing assemblies and support housing. The cross-section, length and number of said asymmetrically arranged beams are chosen as to provide stabilizing cross-coupling stiffness. The anisotropic damper may be hydraulically mounted open, closed or re-circulating.

Figure 1:
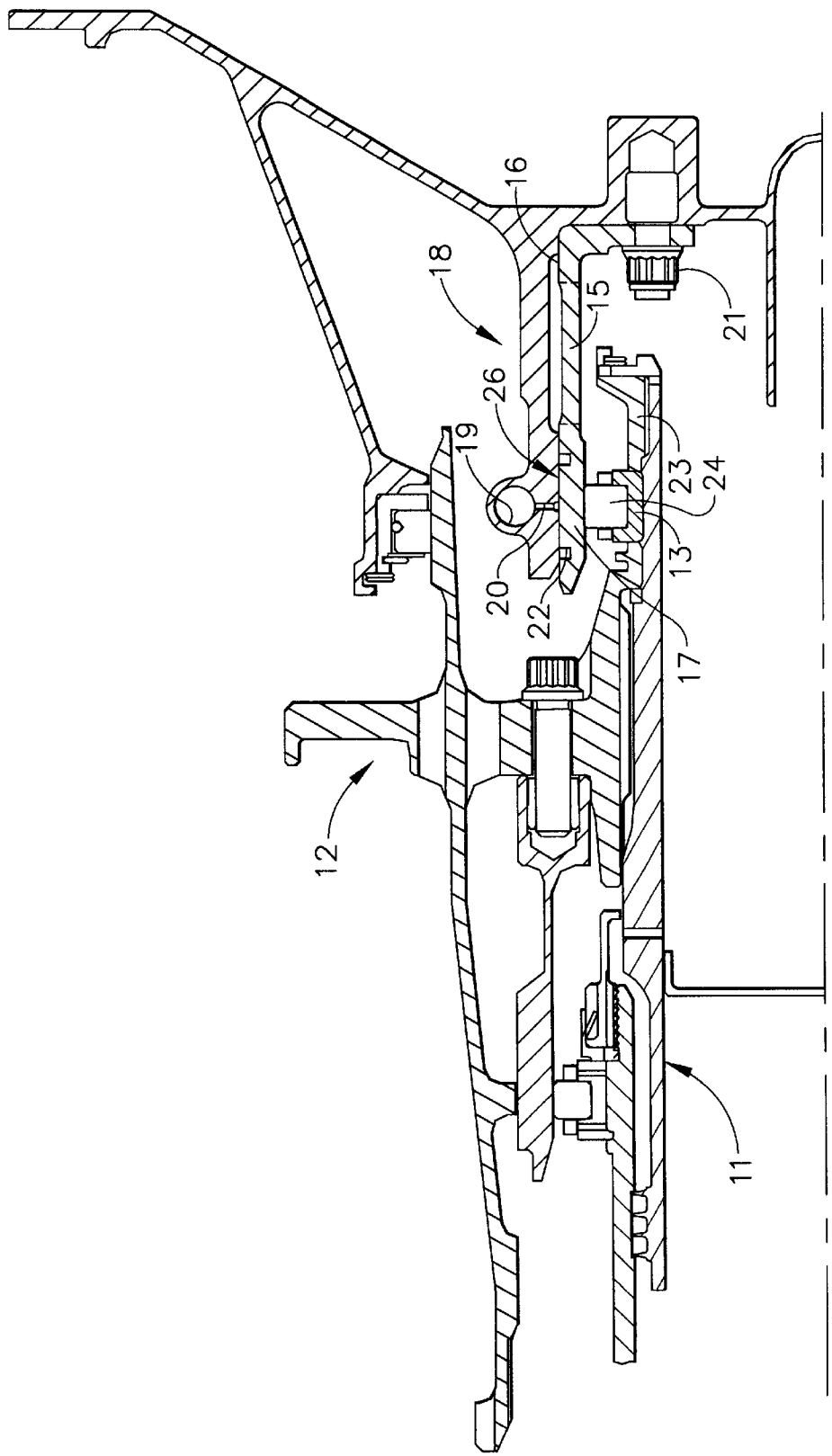
FIG. 1 is a cross sectional view of the present invention according to one embodiment.

One embodiment according to the present invention is shown in FIG. 1. It should be understood that the machine may take any form, such as a turbine or compressor, having its rotary components mounted upon a generally horizontally extended shaft or any other arrangement where the rotor is capable of exerting a relatively high static load upon the bearing. Two or more bearing assemblies support the rotor group. This invention is applicable for any bearing support assembly. The inner race 13 of the roller bearing may be fixed with the rotor 11. The bearing may be stacked with the stub shaft 12 and clamped by a nut 23. The support housing 18 may be clamped to the engine case. The support housing 18 may have an oil supply line feeding to an annular groove 19. The annular groove 19 may feed oil through multiple feed holes 20 to the hydraulic mount 26, formed by the gap between support housing 18 inner diameter and the anisotropic support damper 15.

The anisotropic support damper 15 may be attached to the bearing support housing 18 by studs and nuts 21. The outer diameter of the aft ring 16 of the anisotropic support damper 15 may be off-centered to the inner diameter of the support housing 18 and the variable diameter forward ring 17. This offset, depending on the vertical stiffness of the bearing support, is determined by the weight of the rotor 11. The offset will center the rotor 11 inside the hydraulic mount gap 26 between anisotropic support damper 15 and the bearing support housing 18. The interface bore of the bearing support may be off-centered to provide the same rotor centering feature to the anisotropic support damper 15. The anisotropic support damper 15 may form the outer race for the rollers 24. This feature may enable the bearing to run with reduced radial clearance to improve vibration.

Figure 2:
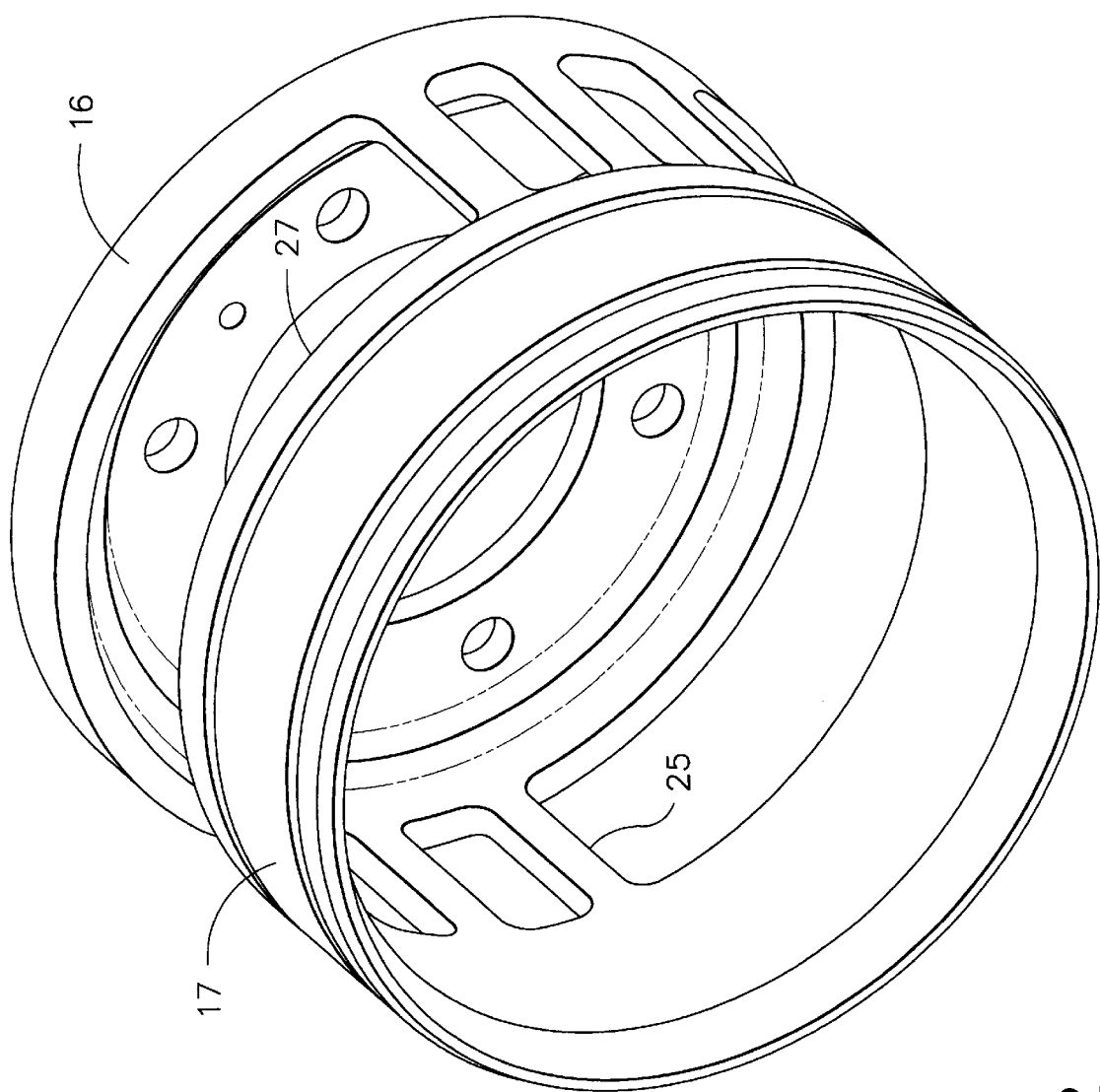
FIG. 2 is an isometric view of the present invention according to the same embodiment.

FIG. 2 depicts the anisotropic support damper 15. The beams 25 length, cross-section, and number may determine required stiffness of the anisotropic support damper 15 for optimum rotor dynamic design. The dimension of the beam sections and their placement in a non-symmetric fashion may provide the required anisotropy to the support stiffness characteristic. This anisotropy may provide cross-coupling stiffness to the rotor dynamic system to counteract the instability force arising from turbine tip clearance, internal friction, working spline, labyrinth seal etc. The embodiment shown has six beams, however, it is envisioned that the present invention be applicable for any number of beams or any other structural member between the variable diameter forward ring 17 and aft ring 16. The aft ring 16 may be eccentric to the support housing's bore 18 to center rotor. The outer diameter of aft ring 16 may be off-centered to the inner diameter of the aft ring 16 and the variable diameter forward ring 17.

Again referring to FIG. 1, the variable diameter forward ring 17 of the anisotropic support damper 15 may provide the outer race for the bearing elements. The outer diameter may have two grooves 22 to house the piston ring for a closed hydraulic mount 26. It should be understood that the present invention is not limited to the piston ring type closed hydraulic mount, but this is merely representative. The hydraulic mount 26 may be a number of mounts known in the art, including an open mount where it will not have piston ring grooves 22. A section of the variable diameter forward ring 17 may be a step up diameter section to form a bumper 27 (FIG. 2) to limit deflection during maneuver and high unbalance created during sudden blade loss, bird strike, and icing conditions. For example, the present invention may be applicable to gas turbines as well as any other turbo machinery. Even though invention piece forms a bearing outer race, it could accommodate a separate bearing outer race which can be press-fitted in to the inner diameter of the forward ring 17. It is applicable to any form of bearing elements, e.g, ball, roller etc. The bearing support can be made from any material, metal, composite etc.

According to one embodiment of the present invention an apparatus for supporting and stabilizing a rotating shaft in a machine is disclosed, comprising a rotor group supported by at least two bearing assemblies, at least one anisotropic support damper, an engine case, at least two nuts and at least two studs for attaching said anisotropic support damper to said support housing, support housing surrounding the bearing assemblies and connected to the engine case. The support housing has an inner and outer diameter. The anisotropic support damper may be comprised of an aft ring and variable diameter forward ring, wherein the aft ring and variable diameter forward ring are connected by at least two asymmetrically arranged beams and the variable diameter forward ring forms the outer race for the bearing assembly. There may also be an inner race for the bearing assembly. There may also be a hydraulic mount formed by the gap between the support housing's inner diameter and the anisotropic support damper.

According to another embodiment, an apparatus for supporting and stabilizing a rotating shaft in a machine is disclosed comprising a rotor group supported by at least two bearing assemblies, wherein the bearing assemblies contain at least one roller bearing with an inner race and an outer race. The inner race of the roller bearing may be fixed to the motor. The roller bearing may also be stacked with a stub shaft and clamped by a nut to said rotor. At least one anisotropic support damper, comprised of an aft ring and variable diameter forward ring, wherein the aft ring and the variable diameter forward ring are connected by at least two asymmetrically arranged beams and the variable diameter forward ring forms the outer race for the roller bearing. There is also an engine case, with at least one support housing surrounding the bearing assemblies and connected to the engine case. The support housing accommodates squeeze film damper in parallel and has an oil supply line contained therein for the delivery of oil through an annular grove to a hydraulic mount. According to one embodiment, the hydraulic mount may be a closed mount and have a clearance between 0.0020 and 0.01 inches formed by a gap between the support housing's inner diameter and the anisotropic support damper and has piston ring grooves. There may be at least two nuts and at least two studs for attaching the anisotropic support damper to the support housing. The support housing may also have an interface bore which is off-centered to provide rotor centering.

According to another embodiment, a method of supporting a rotor with a stationary machine frame is disclosed including mounting a bearing assembly for supporting a rotor within a movable member, suspending the member from the machine frame upon at least two bearing assemblies, establishing a fluid damping film between the member and the machine frame and centering the movable member. The hydraulic mount performance is further enhanced by the cross-coupling stiffness, softness of the bearing support, simultaneously limiting support beam stress and avoiding blade tip rub by limiting the deflection of the rotor components during high maneuver and blade loss. It should be understood that these are, merely representative and instability forces may arise from a number of different modes. The softness of the spring cage may be between 25 klb/in and 700 klb./in. The fluid damping film may be contained within a squeeze film damper that is open, closed or re-circulating type.

It should be understood, of course, that the foregoing relates to preferred embodiments of the invention and that modifications may be made without departing from the spirit and scope of the invention as set forth in the following claims.

We claim:

1. An apparatus for supporting and stabilizing a rotating shaft in a machine comprising:
    a rotor group supported by at least two bearing assemblies; and
    a support housing surrounding said bearing assemblies and connected to an engine case, wherein said support housing has a non-concentric ring, which centers the rotor against the static deflection of the bearing due to the weight of the rotor;
    wherein said support housing accommodates an anisotropic support damper comprised of at least two rings connected by asymmetrically arranged beams, wherein said anisotropic damper is removably attached to said support housing and interfaces said bearing assemblies and said support housing.

2. An apparatus as in claim 1, wherein the cross-section, length and number of said asymmetrically arranged beams are chosen to provide stabilizing cross-coupling stiffness.

3. An apparatus as in claim 1, wherein said anisotropic damper is hydraulically mounted open.

4. An apparatus as in claim 1, wherein said anisotropic damper is hydraulically mounted closed.

5. An apparatus as in claim 1, wherein said anisotropic damper is hydraulically mounted re-circulating.

6. An apparatus as in claim 1, wherein said bearing assembly is stacked with a stub shaft and clamped by a nut.

7. An apparatus as in claim 1, wherein at least one of said bearing assemblies is a roller bearing.

8. An apparatus for supporting and stabilizing a rotating shaft in a machine comprising:
    a rotor group supported by at least two bearing assemblies;
    at least one anisotropic support damper;
    an engine case;
    support housing surrounding said bearing assemblies and connected to said engine case, wherein said support housing has an inner and outer diameter;
    at least two nuts and at least two studs for attaching said anisotropic support damper to said support housing;
    an anisotropic support damper comprised of an aft ring and variable diameter forward ring, wherein said aft ring and said variable diameter forward ring are connected by at least two asymmetrically arranged beams and said variable diameter forward ring forms the outer race for said bearing assembly;

an inner race for said bearing assembly; and a hydraulic mount formed by the gap between said support housing's inner diameter and said anisotropic support damper.

9. An apparatus as in claim 8, wherein said aft ring is eccentric to said support housing's bore to center rotor against the static deflection of the bearing due to the weight of the rotor.

10. An apparatus as in claim 8, wherein the outer diameter of said aft ring is off-centered to the inner diameter of said aft ring and said variable diameter forward ring.

11. An apparatus as in claim 8, wherein said variable diameter forward ring has a land with a step up diameter to form a bumper to limit maneuver deflection of the rotor.

12. An apparatus as in claim 8, wherein said variable diameter forward ring is also the outer race of the bearing.

13. An apparatus as in claim 8, wherein said hydraulic mount is open.

14. An apparatus as in claim 8, wherein said hydraulic mount is closed.

15. An apparatus as in claim 8, wherein said hydraulic mount is re-circulating.

16. An apparatus as in claim 8, wherein the cross-section, length and number of said asymmetrically arranged beams are chosen to provide stabilizing cross-coupling stiffness.

17. An apparatus as in claim 8, wherein said bearing assembly is stacked with a stub shaft and clamped by a nut.

18. An apparatus as in claim 8, wherein at least one of said bearing assemblies is a roller bearing.

19. An apparatus for supporting and stabilizing a rotating shaft in a machine comprising:

a rotor group supported by at least two bearing assemblies, wherein said bearing assemblies contain at least one roller bearing with an inner race and an outer race;

at least one anisotropic support damper, comprised of an aft ring and variable diameter forward ring, wherein said aft ring and said variable diameter forward ring are connected by at least two asymmetrically arranged beams and said variable diameter forward ring forms the outer race for said roller bearing;

an engine case;

at least one support housing surrounding said bearing assemblies and connected to an engine case, wherein said support housing accommodates squeeze film damper in parallel and has an oil supply line contained therein for the delivery of oil through an annular grove to a hydraulic mount, said hydraulic mount being a closed mount formed by a gap between said support housing's inner diameter and said anisotropic support damper and having piston ring grooves; and at least two nuts and at least two studs for attaching said anisotropic support damper to said support housing.

20. An apparatus as in claim 19, wherein said support housing further comprises an interface bore which is off-centered to provide rotor centering.

21. An apparatus as in claim 19, wherein said inner race of said roller bearing is fixed to a rotor.

22. An apparatus as in claim 19, wherein said roller bearing is stacked with a stub shaft and clamped by a nut to said rotor.

23. An apparatus as in claim 19, wherein said hydraulic mount is closed and has a clearance between 0.0020 and 0.01 inches.

24. A method of rotatably supporting a rotor structure with a stationary machine frame including:

mounting a bearing assembly for supporting a rotor within a movable member;

suspending the member from the machine frame upon at least two bearing assemblies;

establishing a fluid damping film between the member and the machine frame; and centering the movable member with cross-coupling stiffness to guard against instability force, enhancing modal damping through the softness of the support and limiting deflection of the rotor components during high maneuver and blade loss.

25. The method of claim 24, further comprising maintaining the softness of a spring cage between 25 klb/in and 700 klb./in.

26. The method of claim 24, further comprising containing said fluid damping film within a squeeze film damper that is hydraulically mounted open.

27. The method of claim 24, further comprising containing said fluid damping film within a squeeze film damper that is hydraulically mounted closed.

28. The method of claim 24, further comprising containing said fluid damping film within a squeeze film damper that is re-circulating hydraulically mounted.

* * * * *